(12) United States Patent
Dierksmeier et al.

(10) Patent No.: US 10,934,942 B2
(45) Date of Patent: Mar. 2, 2021

(54) INLET TURBINE AND TRANSMISSION FOR HIGH-MACH ENGINES

(71) Applicant: Rolls-Royce North American Technologies, Inc., Indianapolis, IN (US)

(72) Inventors: Douglas D. Dierksmeier, Franklin, IN (US); Edward C. Rice, Indianapolis, IN (US); Steven W. Tomlinson, Brownsburg, IN (US); Bradley E. Auker, Coatesville, IN (US); Donald Klemen, Carmel, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 406 days.

(21) Appl. No.: 15/418,186

(22) Filed: Jan. 27, 2017

(65) Prior Publication Data
US 2017/0234240 A1 Aug. 17, 2017

Related U.S. Application Data

(60) Provisional application No. 62/295,857, filed on Feb. 16, 2016.

(51) Int. Cl.
| | |
|---|---|
| *F02C 9/00* | (2006.01) |
| *F02C 9/18* | (2006.01) |
| *F02C 7/36* | (2006.01) |
| *F02C 3/107* | (2006.01) |
| *B64D 33/02* | (2006.01) |
| *B64D 27/10* | (2006.01) |
| *B64C 30/00* | (2006.01) |

(52) U.S. Cl.
CPC ............ *F02C 9/18* (2013.01); *B64D 33/02* (2013.01); *F02C 3/107* (2013.01); *F02C 7/36* (2013.01); *B64C 30/00* (2013.01); *B64D 27/10* (2013.01); *B64D 2033/026* (2013.01); *F05D 2220/80* (2013.01); *F05D 2270/304* (2013.01)

(58) Field of Classification Search
CPC .. F02C 3/107; F02C 3/113; F02C 7/36; F02C 9/18; F02K 3/075; F02K 7/16; F02K 9/78; F05D 2220/10; F05D 2220/80; F05D 2220/4023; F05D 2220/304
See application file for complete search history.

(56) References Cited

U.S. PATENT DOCUMENTS

| | | |
|---|---|---|
| 3,105,661 A | 10/1963 | Ferri et al. |
| 3,719,428 A * | 3/1973 | Dettmering ............... F02C 7/04 |
| | | 415/181 |
| 4,224,790 A | 9/1980 | Christensen |
| 4,267,775 A | 5/1981 | Sjotun et al. |
| 4,275,857 A | 6/1981 | Bergsten et al. |

(Continued)

OTHER PUBLICATIONS

Zalud, Gears Put a New Spin on Turbofan Performance, 1998, Machine Design (Year: 1998).*

Primary Examiner — Todd E Manahan
Assistant Examiner — Edwin Kang
(74) *Attorney, Agent, or Firm* — Barnes & Thornburg LLP

(57) ABSTRACT

A high-Mach engine includes a gas turbine core, an inlet assembly, and a transmission. The inlet assembly including an inlet turbine and the transmission configured to couple the inlet turbine and a core turbine of the gas turbine core cooperate to control air moving through the high-Mach engine.

12 Claims, 5 Drawing Sheets

(56) References Cited

U.S. PATENT DOCUMENTS

| | | | |
|---|---|---|---|
| 5,054,288 A * | 10/1991 | Salemann | F02K 3/075 60/244 |
| 5,076,052 A * | 12/1991 | Wildner | F02C 7/042 60/244 |
| 6,127,758 A | 10/2000 | Murry et al. | |
| 6,270,309 B1 | 8/2001 | Ghetzler et al. | |
| 7,216,474 B2 | 5/2007 | Bulman et al. | |
| RE43,731 E | 10/2012 | Bulman et al. | |
| 8,678,310 B2 | 3/2014 | Masoudipour et al. | |
| 8,882,028 B2 | 11/2014 | Chase | |
| 2004/0159105 A1 * | 8/2004 | Tanaka | F01D 15/10 60/773 |
| 2006/0064960 A1 | 3/2006 | Johnson | |
| 2007/0144172 A1 * | 6/2007 | Sumser | F02B 37/013 60/602 |
| 2011/0150633 A1 * | 6/2011 | Baughman | F02C 3/064 415/129 |
| 2011/0162341 A1 * | 7/2011 | Parry | F02C 3/107 60/39.182 |
| 2012/0063879 A1 * | 3/2012 | Veilleux, Jr. | F02C 7/32 415/1 |
| 2012/0159925 A1 * | 6/2012 | Duge | F02K 3/02 60/204 |
| 2013/0098055 A1 * | 4/2013 | Kupratis | F02C 7/143 60/774 |
| 2013/0248657 A1 | 9/2013 | Riordan | |
| 2013/0269366 A1 | 10/2013 | Haugen et al. | |
| 2015/0158597 A1 * | 6/2015 | Suciu | B64D 41/007 60/204 |
| 2015/0252732 A1 * | 9/2015 | Kupratis | F02K 3/075 60/226.3 |
| 2015/0337762 A1 * | 11/2015 | Penda | F02K 1/70 415/123 |
| 2016/0105078 A1 * | 4/2016 | Santini | F02C 7/36 290/52 |
| 2016/0273456 A1 * | 9/2016 | Zhang | F02C 7/22 |
| 2017/0082033 A1 * | 3/2017 | Wu | F04D 25/02 |

* cited by examiner

INLET TURBINE AND TRANSMISSION FOR HIGH-MACH ENGINES

CROSS REFERENCE TO RELATED APPLICATIONS

This application claims priority to and the benefit of U.S. Provisional Patent Application No. 62/295,857, filed 16 Feb. 2016, the disclosure of which is now expressly incorporated herein by reference.

FIELD OF THE DISCLOSURE

The present disclosure relates generally to gas turbine engines, and more specifically to high-Mach gas turbine engines adapted for use in very high-speed air vehicles.

BACKGROUND

High-Mach gas turbine engines are used to power aircraft, projectiles, and the like. These high-Mach gas turbine engines typically include an engine core with a compressor, a combustor, and a turbine. The compressor compresses air drawn into the engine and delivers high pressure air to the combustor. In the combustor, fuel is mixed with the high pressure air and is ignited producing hot, high temperature gasses to drive the turbine and to provide thrust that propels the engine.

Travelling at supersonic speeds can lead to increased friction between the high-Mach gas turbine engines and the atmosphere which heats the air entering the engine core to extreme temperatures. Exposing components of the engine core to these extreme temperatures can lead to decreased performance or engine failure. To overcome the damaging temperatures, various cooling methods have been employed to remove the heat from the atmosphere before entering the gas turbine engine. However, the increased weight and maintenance from these methods, such as heat exchangers and refrigeration systems, can lead to decreased engine performance.

SUMMARY

The present disclosure may comprise one or more of the following features and combinations thereof.

According to the present disclosure, a high-Mach engine may include a gas turbine engine core and an inlet assembly including an inlet turbine. The gas turbine engine core may include a compressor, a combustor, and a core turbine. The inlet turbine may be configured to be driven by air entering the high-Mach engine before the air reaches the compressor of the gas turbine engine core when the high-Mach engine is travelling at high speeds to cool air that enters the gas turbine core.

In illustrative embodiments, the high-Mach engine may include a transmission configured to selectively couple the inlet turbine to the core turbine of the gas turbine engine core. Accordingly, the transmission may be movable between (i) a disengaged configuration in which the inlet turbine is rotatable independent of the core turbine, and (ii) an engaged configuration in which the inlet turbine drives rotation of the core turbine.

In illustrative embodiments, the high-Mach engine may include a controller coupled to the transmission. The controller may be configured to move the transmission from the disengaged configuration to the engaged configuration based on speed inputs associated with rotation of at least one of the inlet turbine and the core turbine.

In illustrative embodiments, the inlet assembly defines an inlet bypass passageway configured to conduct air from atmosphere to the compressor of the gas turbine engine core without interacting with the inlet turbine and the inlet assembly includes a core-flow director movable between (i) an open position arranged to allow air from the inlet bypass passageway to move through the inlet bypass passageway and interact with the engine core and (ii) a closed position arranged to block air from moving through the inlet bypass passageway into the gas turbine core so that air entering the gas turbine engine core interacts with the inlet turbine.

In illustrative embodiments, the controller is coupled to the core-flow director and is configured to move the core-flow director from the closed position to the opened position based on inputs associated with at least one of the core turbine, the inlet turbine, and speed of the high-Mach engine through atmosphere.

In illustrative embodiments, the high-Mach engine may include a generator coupled to the gas turbine engine core to be driven by the gas turbine core.

In illustrative embodiments, the transmission includes a clutch configured to move from a disengaged position associated with the disengaged configuration of the transmission to an engaged position associated with the engaged configuration of the transmission.

In illustrative embodiments, the clutch is a sleeve having splines, the sleeve configured to slide along a clutch axis from the disengaged position in which the splines are disengaged from corresponding splines to the engaged position in which the splines are engaged with corresponding splines.

In illustrative embodiments, the transmission includes a hydraulic solenoid coupled to the sleeve and to a pressurized fuel source, the hydraulic solenoid configured to drive the sleeve from the disengaged position to the engaged position with fuel pressure.

In illustrative embodiments, the transmission includes a gear set coupled between an output shaft mounted to the inlet turbine and an input shaft mounted to the core turbine.

In illustrative embodiments, the gear set is configured such that the speed of the output shaft mounted to the inlet turbine is lower than the speed of the input shaft mounted to the core turbine.

According to the present disclosure, a high-Mach engine may include (i) an engine core including a compressor, a combustor, and a turbine and (ii) an inlet turbine configured to be driven by air entering the high-Mach engine from atmosphere before the air reaches the compressor of the gas turbine engine core.

In illustrative embodiments, the high-Mach engine may include a transmission configured to couple the inlet turbine to the gas turbine engine core such that the rotation of the inlet turbine is transmitted to at least one component of the gas turbine engine core.

In illustrative embodiments, the transmission is reconfigurable from a disengaged configuration in which the inlet turbine is rotatable independent of the core turbine to an engaged configuration in which the inlet turbine drives rotation of the core turbine.

In illustrative embodiments, the transmission includes a splined sleeve mounted to slide along an axis from a disengaged position associated with the disengaged configuration of the transmission to an engaged position associated with the engaged configuration of the transmission.

In illustrative embodiments, the engine may include a controller coupled to the transmission, the controller configured to move the sleeve from the disengaged position to the engaged position based on speed inputs associated with rotation of at least one of the inlet turbine and the core turbine.

In illustrative embodiments, an inlet assembly that includes the inlet turbine defines an inlet bypass passageway configured to conduct air from atmosphere to the compressor of the gas turbine engine core without interacting with the inlet turbine.

In illustrative embodiments, the inlet assembly includes a core-flow director configured to block or allow air from the inlet bypass passageway to enter the compressor of the gas turbine engine core.

According to another aspect of the present disclosure, a method of operating a high-Mach engine is taught. The method may include propelling the high-Mach engine to a speed greater than Mach 1, closing an inlet bypass passageway configured to conduct air from atmosphere to a compressor included in a gas turbine engine core so that air from atmosphere is forced to interact with an inlet turbine before entering the compressor of the gas turbine engine core such that the air is cooled before entering the compressor, and moving a transmission configured to selectively couple the inlet turbine to at least one component included in the gas turbine engine core from a disengaged configuration in which the inlet turbine is rotatable independent of the at least one component of the gas turbine engine core to an engaged configuration in which the inlet turbine drives rotation of the at least one component of the gas turbine engine core.

In illustrative embodiments, the step of moving the transmission includes (i) detecting a rotational speed of at least one of the inlet turbine and at least one component included in the turbine engine core, and (ii) moving a clutch included in the transmission to an engaged position when the rotational speed detected reaches a predetermined value or set of values.

In illustrative embodiments, the transmission includes a splined sleeve mounted to slide along an axis from a disengaged position associated with the disengaged configuration of the transmission to an engaged position associated with the engaged configuration of the transmission.

In illustrative embodiments, the transmission includes a gear set coupled between an output shaft mounted to the inlet turbine and an input shaft mounted to the core turbine, the gear set configured to offset the rotational speed of the output shaft from the rotational speed of the input shaft

DETAILED DESCRIPTION OF THE DRAWINGS

Figure 1:
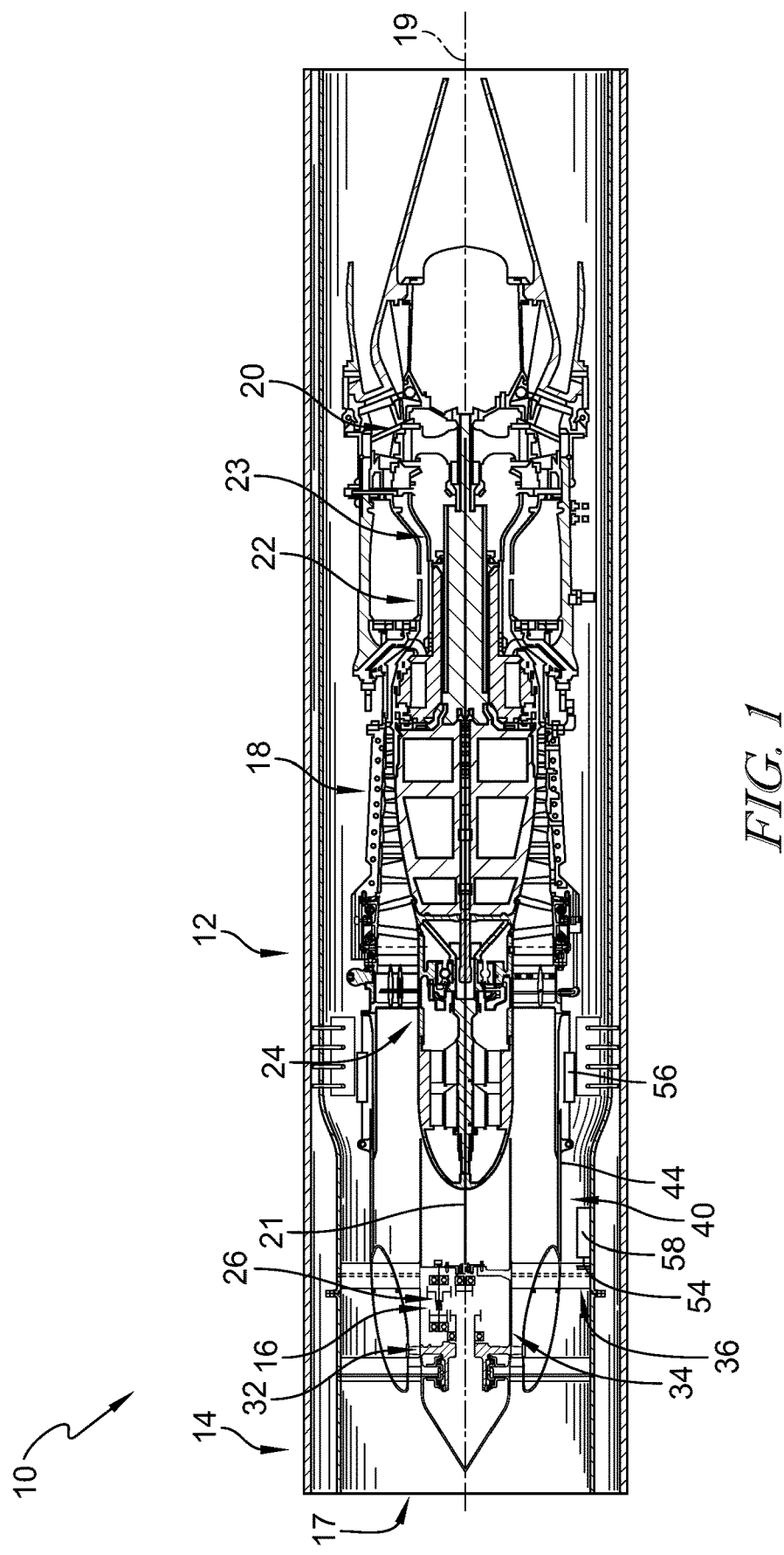
FIG. 1 is a sectional view of a high-Mach engine that includes a gas turbine core, an inlet assembly including an inlet turbine configured to be driven by air that enters the high-Mach engine when the high-Mach engine is travelling at a relatively high rate of speed, and a transmission configured to selectively couple the inlet turbine to a core turbine of the gas turbine core.

For the purposes of promoting an understanding of the principles of the disclosure, reference will now be made to a number of illustrative embodiments illustrated in the drawings and specific language will be used to describe the same.

An illustrative high-Mach engine 10 includes a gas turbine core 12, an inlet assembly 14 with an inlet turbine 32, and a transmission 16 as shown in FIGS. 1-5. The gas turbine core 12 receives air from atmosphere 17 that is passed through the inlet assembly 14 and provides thrust for propelling the high-Mach engine 10. The inlet turbine 32 of the inlet assembly 14 is configured to selectively cool air that enters the gas turbine core 12 when the high-Mach engine 10 travels at high speed frictionally heating air entering the engine 10. The transmission 16 is configured to selectively couple the inlet turbine 32 with a core turbine 20 of the gas turbine core 12 so that the inlet turbine 16 is loaded by (and drives rotation of) the core turbine 20 as suggested in FIGS. 2 and 4.

Figure 6:
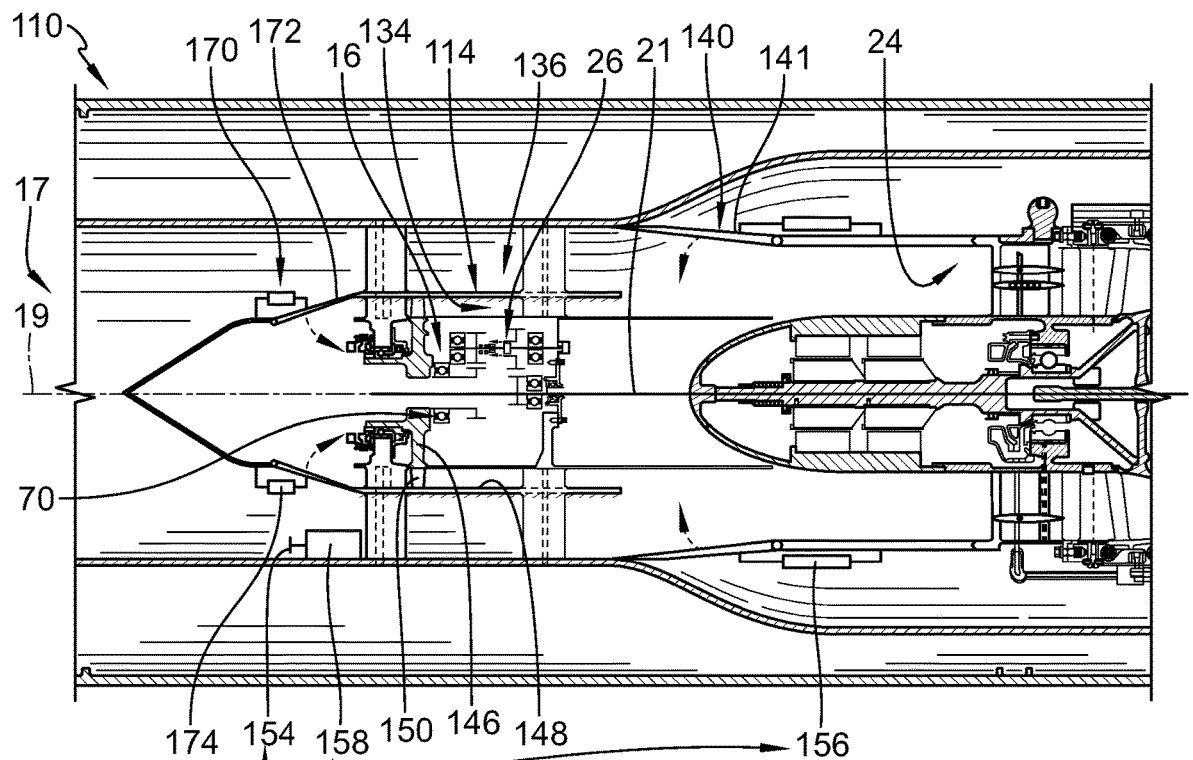
FIG. 6 is a cross sectional view of a portion of another high-Mach engine similar to that shown in FIGS. 1 and 2 including a gas turbine core, an inlet assembly including an inlet turbine configured to be driven by air that enters the high-Mach engine when the high-Mach engine is travelling at a relatively high rate of speed, a transmission configured to selectively couple the inlet turbine to a core turbine of the gas turbine core, and a core-flow director configured to selectively allow air to bypass the inlet turbine (as it would when the high-Mach engine is travelling at a relatively low rate of speed), and further showing that the core-flow director is illustratively provided by a set of doors mounted to pivot from an opened position and inlet-flow director mounted to pivot from an opened position, shown in FIG. 6, to a closed position, shown in FIG. 7.
Figure 7:
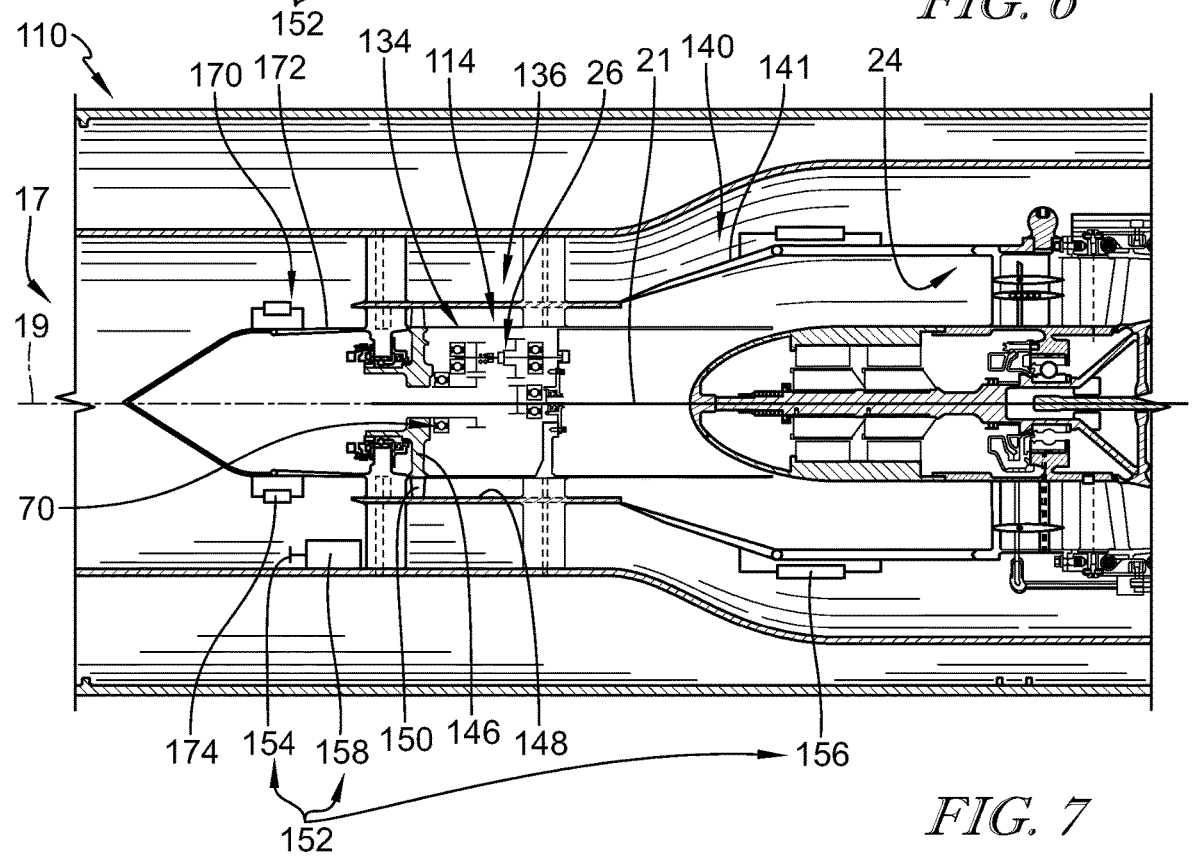
FIG. 7 is a view similar to FIG. 6 with the transmission in the engaged configuration in which the inlet turbine drives rotation of the core turbine and the core-flow director moved to the closed position by pivoting the doors showing the core-flow director blocking air from moving through the bypass passageway into the engine core so that air entering the gas turbine core interacts with the inlet turbine in order to be cooled (as it would when the high-Mach gas turbine engine is travelling at a relatively high rate of speed)
Figure 8:
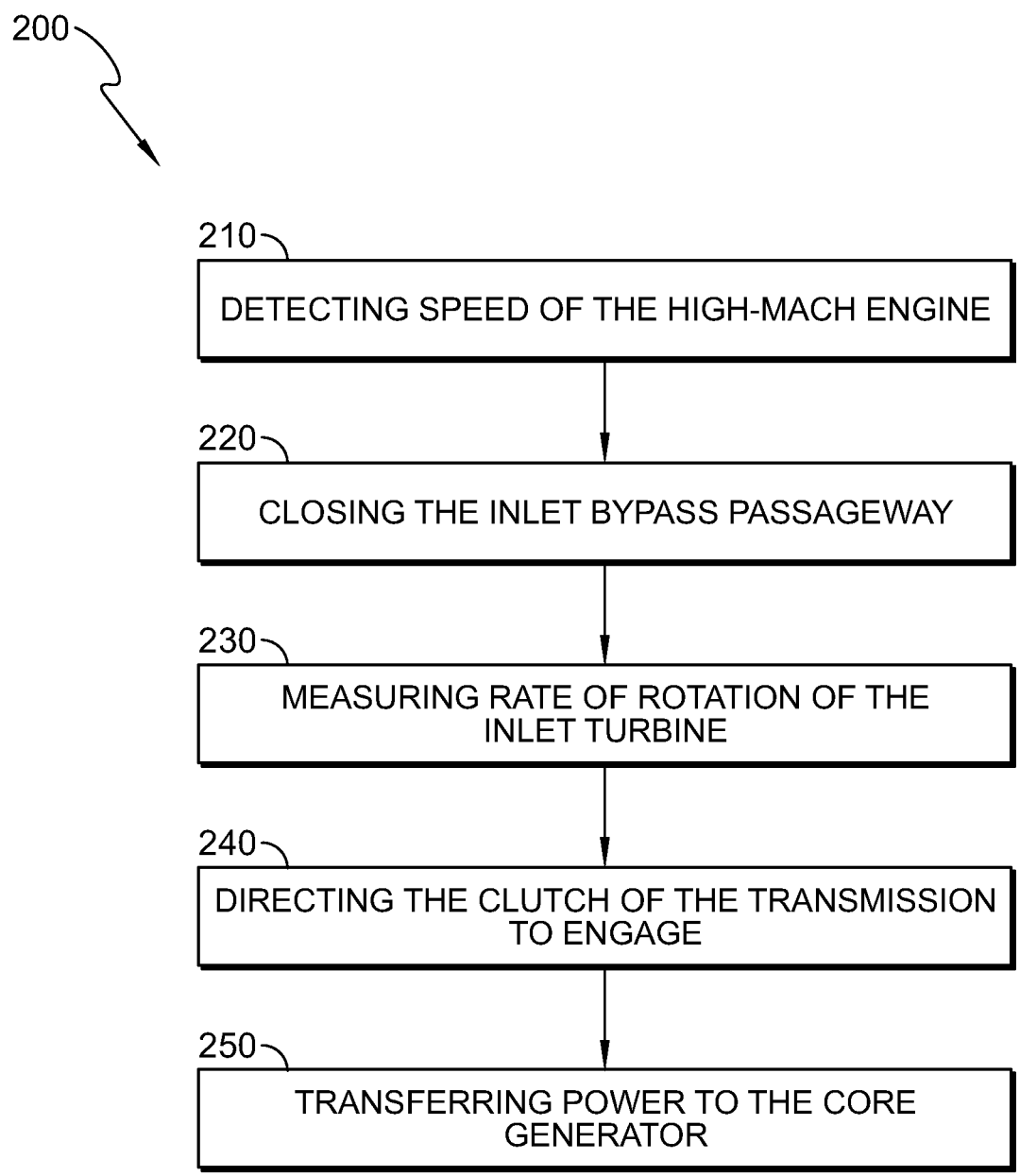
FIG. 8 is a block diagram of a method of operating a high-Mach engine like those shown in FIGS. 1-7.

A second embodiment of a high-Mach engine 110 incorporating a different core-flow director 140 in accordance with the present disclosure is shown in FIGS. 6 and 7. A method of operating the high-Mach engines 10, 110 is shown in FIG. 8

The gas turbine core 12 is configured to propel the high-Mach engine 10 at speeds in excess of Mach 3 and illustratively includes a compressor 18, a core turbine 20, and a combustor 22 as shown in FIG. 1. The compressor 18 compresses the air entering the gas turbine core 12 through a gas turbine inlet 24 and delivers the compressed air to the combustor 22. The combustor 22 mixes fuel with the compressed air received from the compressor 18 and ignites the fuel.

The hot, high-pressure products of the combustion reaction in the combustor 22 interact with the core turbine 20 to cause the core turbine 20 to rotate about a central axis 19. Rotation of the core turbine 20 drives the compressor 18, an input shaft 21, and a core generator 23. Products of the combustion reaction, after interacting with the core turbine 20, are discharged from the gas turbine core 12 to the atmosphere 17 and provide thrust for the high-Mach engine 10.

The transmission 16 is coupled to the inlet turbine 32 and the core turbine 20 as shown in FIGS. 1-5. The transmission 16 is movable between a disengaged configuration in which the inlet turbine 32 is rotatable independent of the core turbine 20 and an engaged configuration in which the inlet turbine 32 drives rotation of the core turbine 20.

The transmission 16 illustratively includes a clutch 26, a hydraulic solenoid 28, and a gear set 30 as shown in FIGS. 1-5. The clutch 26 is movable along a clutch axis 26A from a disengaged position to an engaged position. The hydraulic solenoid 28 is coupled to the clutch 26 and is configured to move the clutch 26 from the disengaged position to the engaged position. The gear set 30 is configured such that the speed of an output shaft 42 from the inlet turbine 32 is lower than the speed of inlet shaft mounted 21 to the core turbine 20

Figure 2:
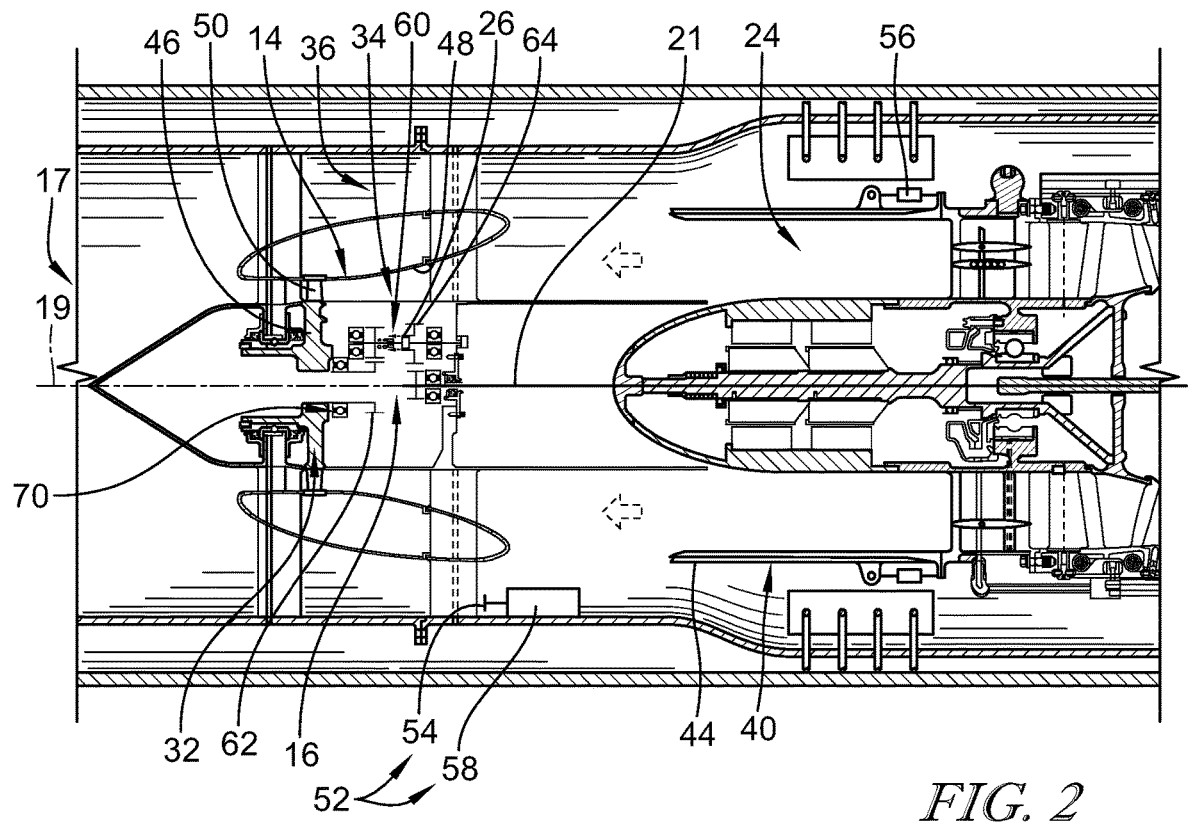
FIG. 2 is a detailed view of a portion of FIG. 1 showing that structure of an inlet assembly, which includes the inlet turbine and the core-flow director, defines an inlet turbine passageway arranged to conduct atmospheric air that interacts with the inlet turbine on its way to the engine core and a bypass passageway arranged to conduct atmospheric air that bypasses the inlet turbine on its way to the engine core, and showing that the transmission is in the disengaged configuration in which the inlet turbine is rotatable independent of the core turbine while the core-flow director is in an opened position allowing air to move through the bypass passageway into the gas turbine core (as it would when the high-Mach gas turbine engine is travelling at a relatively low rate of speed)
Figure 3:
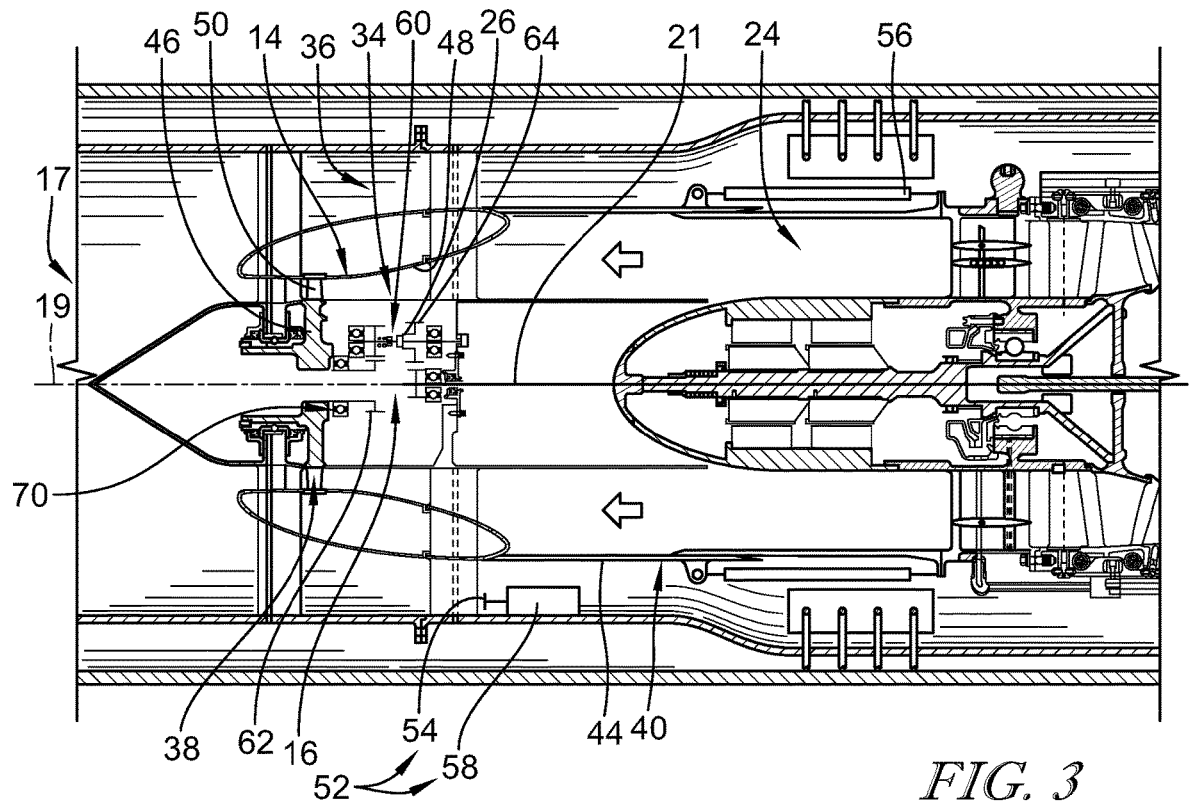
FIG. 3 is a view similar to FIG. 2 with the transmission in the engaged configuration in which the inlet turbine drives rotation of the core turbine when the core-flow director is moved to a closed position by sliding along the central engine axis showing the core-flow director blocking air from moving through the bypass passageway into the gas turbine core so that air entering the gas turbine core interacts with the inlet turbine to be cooled (as it would when the high-Mach gas turbine engine is travelling at a relatively high rate of speed)

The inlet assembly 14 is mounted between the compressor 18 and the atmosphere 17 and is configured to cool air from the atmosphere 17 before it enters the gas turbine core 12 when air temperatures are elevated because of the speed of the high-Mach engine 10 through the atmosphere 17 as suggested in FIGS. 1 and 3. Structure of the inlet assembly 14 defines an inlet turbine passageway 34 and an inlet bypass passageway 36 configured so that air entering the high-Mach engine 10 must flow through either the inlet turbine passageway 34 or the inlet bypass passageway 36 in order to enter the gas turbine core 12 as shown in FIGS. 1-3.

The inlet assembly 14 illustratively includes the inlet turbine 32, a core-flow director 40, and an output shaft 42 as shown in FIGS. 1-3. The inlet turbine 32 extends into the inlet turbine passageway 34 and can be driven by air passing through the inlet turbine passageway 34 to cool the air by removing energy therefrom. The core-flow director 40 directs air from the atmosphere 17 to interact with the inlet turbine 32 when the high-Mach engine 10 is travelling at relatively high speeds so that the air is cooled before entering the gas turbine core 12. The core-flow director 40 is movable from an open position to a closed position when the high-Mach engine 10 is travelling at high-speeds so the inlet assembly 14 can cool the air entering the gas turbine core 12. The output shaft 42 extends from the inlet turbine 32 to the transmission 16.

When the core-flow director 40 is in the open position, the core-flow director 40 is arranged to allow air from the inlet bypass passageway 36 to enter the gas turbine core 12 without interacting with the inlet turbine 32 as shown in FIG. 2. When the core-flow director is in the closed position, the core-flow director 40 is arranged to block air from moving from the inlet bypass passageway 36 to interact with the gas turbine core 12 thereby forcing air reaching the gas turbine core 12 to pass through the inlet turbine passageway 34 and interact with the inlet turbine 32 to cool the air as shown in FIG. 3.

Illustratively, the inlet turbine passageway 34 and the inlet bypass passageway 36 each form an annular ring and extend around the central axis 19 so the inlet turbine passageway 34 and the inlet bypass passageway 36 are coaxial. In the exemplary embodiment, the core-flow director 40 is provided by a collar 44 that is slidable along the central axis 19 between the opened and closed positions. The collar 44 extends around the central axis 19 and is located between the inlet turbine passageway 34 and the inlet bypass passageway 36 when in the closed position. In the exemplary embodiment, the collar 44 forms an annular ring and is coaxial with the inlet turbine passageway 34 and the inlet bypass passageway 36.

The inlet turbine 32 includes an inlet turbine wheel assembly 46 and an inlet turbine shroud 48 to locate the inlet turbine passageway 34 therebetween. A set of inlet turbine blades 50 extend from the inlet turbine wheel assembly 46 into the inlet turbine passageway 34 to interact with air passing through the inlet turbine passageway 34. When the core-flow director 40 is in the closed position, air is forced to pass through the inlet turbine passageway 34 and interact with the inlet turbine 32 before entering the gas turbine core 12 causing the inlet turbine 32 to rotate.

The high-Mach engine 10 can further include an inlet control system 52 including a sensor 54, a core-flow-director actuator 56, and a controller 58 coupled to the transmission 16, the sensor 54, and the core-flow-director actuator 56 as shown in FIGS. 2 and 3. When the sensor 54 detects a certain parameter of the high-Mach engine 10 it sends a signal to the controller 58. When the controller 58 receives the data from the sensor 54 it directs the core-flow-director actuator 56 to move the core-flow director 40 from the open position to the closed position thereby forcing air to pass through the inlet turbine passageway 34 before interacting with the gas turbine core 12.

Conversely, the controller 58 may direct the core-flow-director actuator 56 to move the core-flow director 40 to the closed position, thereby allowing air to enter the gas turbine core 12 from the inlet bypass passageway 36. Moreover, in some embodiments, the controller 58 can move the core-flow director 40 to various locations between the open position and the closed position based on data from the sensor 54.

The sensor 54 in the illustrative embodiment is configured to detect the speed of the high-Mach engine 10 moving through the atmosphere 17 as shown in FIGS. 2 and 3. When the sensor 54 detects the high-Mach engine 10 moving at a predetermined speed, the sensor 54 sends a signal to the controller 58. It is within the scope of the present disclosure for the predetermined speed to be about, or specifically Mach 4 or Mach 5. In other embodiments, the predetermined speed is less than Mach 4.

The controller 58 can also be coupled to a rotation sensor 70 as shown in FIGS. 2-5. In an embodiment, the rotation sensor 70 is configured to measure the speed of rotation of the inlet turbine 32. In another embodiment, the rotation sensor 70 is configured to measure the rotation of the core turbine 20.

The core-flow-director actuator 56 is coupled to the core-flow director 40 and the controller 58 as shown in FIGS. 2 and 3. The core-flow-director actuator 56 functions to move the core-flow director 40 along the central axis 19 from the opened position to the closed position when the controller 58 sends a signal.

Figure 4:
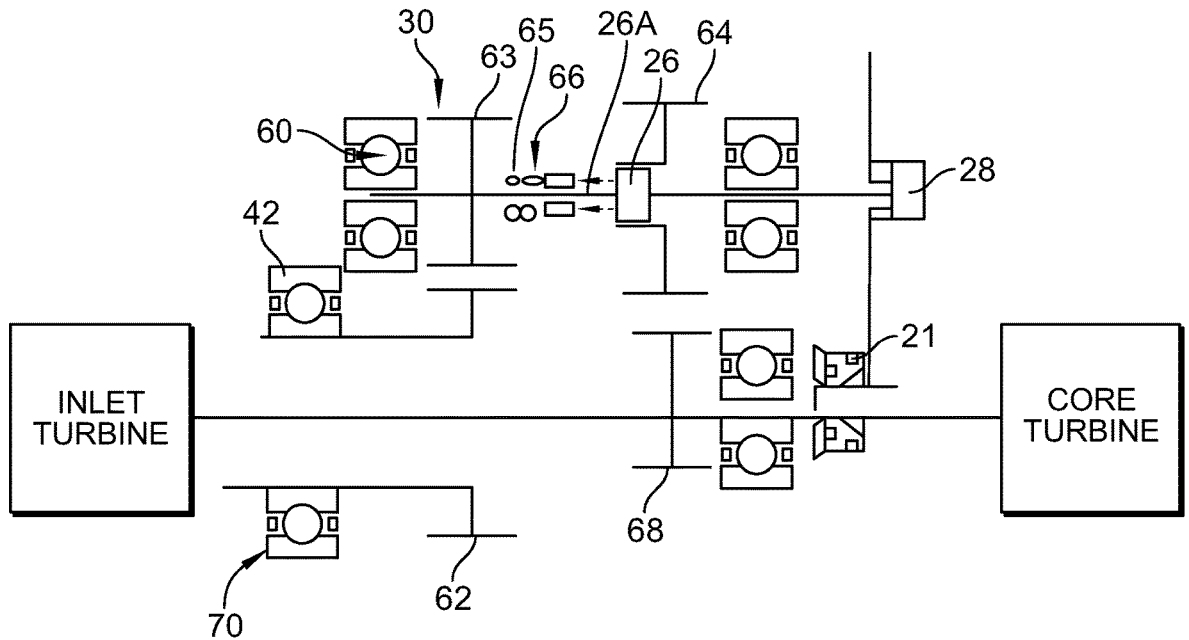
FIG. 4 is a detailed view of a portion of FIG. 1 showing the transmission in a disengaged configuration coupled to the inlet turbine and the core turbine, with the transmission including a clutch embodied as a sleeve having splines arranged to slide along a clutch axis from a disengaged position associated with the disengaged configuration of the transmission to an engaged position associated with the engaged configuration of the transmission, as shown in FIG. 3.
Figure 5:
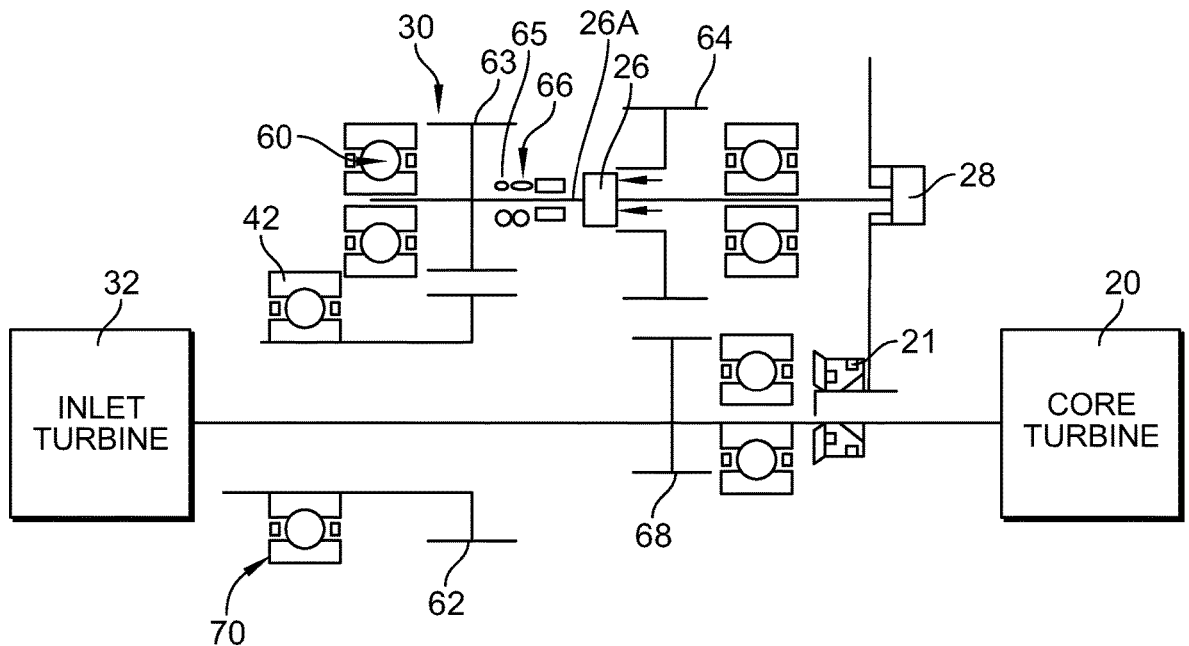
FIG. 5 is a view similar to FIG. 4 with the transmission in the engaged configuration showing the clutch has moved along the clutch axis.

In the illustrative embodiment, the transmission 16 is coupled to the controller 58 as shown in FIGS. 4 and 5. The controller 58 is configured to receive data from the sensor 54 and direct the clutch 26 to move from the disengaged position to the engaged position. In some embodiments, the controller 58 is included in the transmission 16.

The transmission 16 includes the clutch 26, the hydraulic solenoid 28, and a countershaft assembly 60. The clutch 26 is movable along a clutch axis 26A from the disengaged position to the engaged position. In the illustrative embodiment, the clutch 26 is a sleeve having splines. The hydraulic solenoid 28 is coupled to the clutch 26 and is configured to move the clutch 26 along the clutch axis 26A from the disengaged position to the engaged position as shown in FIGS. 4 and 5. The countershaft assembly 60 is configured to interconnect the output shaft 42 of the inlet turbine 32 and the input shaft 21 of the core turbine 20.

The countershaft assembly 60 includes a countershaft-gear shaft 66 and the gear set 30 including an inlet turbine pinion 62, a gear-shaft gear 63, and a countershaft pinion 64, as shown in FIGS. 4 and 5. The countershaft-gear shaft 66 extends between the gear-shaft gear 63 and the countershaft pinion 64. The countershaft-gear shaft 66 includes a set of corresponding splines 65 configured to engage with the splines of the clutch 26 when the clutch 26 is moved to the engaged position. The inlet turbine pinion 62 is configured to be driven by the inlet turbine output shaft 42 and interact with the gear-shaft gear 63. The countershaft pinion 64 is configured to be driven by the countershaft-gear shaft 66 when the clutch 26 moves to the engaged position.

In an embodiment, the gear set 30 is configured to cooperate such that the speed of the output shaft 42 from the inlet turbine 32 is lower than the speed of inlet shaft mounted 21 to the core turbine 20. However any suitable gear ratio may be used.

The hydraulic solenoid 28 is arranged to receive signals from the controller 58 and is coupled to a pressurized fuel source as shown in FIGS. 4 and 5. When the high-Mach engine 10 is travelling at a high-rate of speed, an inlet turbine sensor can send a signal to the controller 58 which can send a signal to the hydraulic solenoid 28 to move the clutch 26 along the clutch axis 26A to engage with the corresponding splines 65 on the countershaft-gear shaft 66. When the transmission 16 is in the engaged configuration, rotational power provided by the inlet turbine 32 is passed through the countershaft assembly 60 to drive an input shaft gear 68 included in the input shaft 21. When in the transmission 16 is in the engaged configuration, the inlet turbine 32 can transfer power to the core turbine 20 or directly power a core generator 23 to provide power to the high-Mach engine 10.

When the transmission 16 is in the disengaged configuration, the inlet turbine 32 is rotatable independent of the core turbine 20 as shown in FIGS. 2 and 4. When the transmission 16 is in the engaged configuration, the inlet turbine 32 drives rotation of the core turbine 20 as shown in FIGS. 3 and 5.

Another illustrative high-Mach engine 110 is shown in FIGS. 6-7. The high-Mach engine 110 is substantially similar to the high-Mach engine 10 shown in FIGS. 1-5 and described herein. Accordingly, similar reference numbers in the 10 series indicate features that are common between the high-Mach engine 10 and the high-Mach engine 110. The description of the high-Mach engine 10 is hereby incorporated by reference to apply to the high-Mach engine 110, except in instances when it conflicts with the specific description and drawings of the of the high-Mach engine 110.

In another embodiment, the high-Mach engine 110 includes a gas turbine core 12, an inlet assembly 114 with an inlet turbine 132, and a transmission 16. The transmission 16 is configured to selectively couple the inlet turbine 132 with a core turbine 20 of the gas turbine core 12 to selectively cool air that enters the gas turbine core 12 as shown in FIGS. 5-6. The gas turbine core 12 receives air from atmosphere 17 that is passed through the inlet assembly 114 and provides thrust for propelling the high-Mach engine 110. The inlet assembly 114 is coupled to the transmission 16 and is located between the gas turbine core 12 and the atmosphere 17 as shown in FIGS. 6-7.

The inlet assembly 114 is mounted between the compressor 18 and the atmosphere 17. The inlet assembly 114 is configured to cool air from the atmosphere 17 before it enters the gas turbine core 12 when air temperatures are elevated because of the speed of the high-Mach engine 110 through the atmosphere 17 as suggested in FIG. 7. Structure of the inlet assembly 114 defines an inlet turbine passageway 134 and an inlet bypass passageway 136 configured so that air entering the high-Mach engine 110 must flow through either the inlet turbine passageway 134 or the inlet bypass passageway 136 in order to enter the gas turbine core 12 as shown in FIGS. 6-7.

The inlet assembly 114 illustratively includes the inlet turbine 132, a core-flow director 140, and an output shaft 142 as shown in FIGS. 6-7. The inlet turbine 132 extends into the inlet turbine passageway 134 and can be driven by air passing through the inlet turbine passageway 134 to cool the air by removing energy therefrom. The core-flow director 140 directs air from the atmosphere 17 to interact with the inlet turbine 132 when the high-Mach engine 110 is travelling at relatively high speeds so that the air is cooled before entering the gas turbine core 12. The core-flow director 140 is movable from an open position to a closed position when the high-Mach engine 110 is travelling at high-speeds so the inlet assembly 114 can cool the air entering the gas turbine core 12. The output shaft 142 extends from the inlet turbine 132 to the transmission 16.

When the core-flow director 140 is in the open position, the core-flow director 140 is arranged to allow air from the inlet bypass passageway 136 to enter the gas turbine core 12 without interacting with the inlet turbine 132 as shown in FIG. 6. When the core-flow director 140 is in the closed position, the core-flow director 140 is arranged to block air from moving from the inlet bypass passageway 136 to interact with the gas turbine core 12 thereby forcing air reaching the gas turbine core 12 to pass through the inlet turbine passageway 134 and interact with the inlet turbine 132 to cool the air as shown in FIG. 7.

Illustratively, the inlet turbine passageway 134 and the inlet bypass passageway 136 each form an annular ring and extend around the central axis 19 so the inlet turbine passageway 134 and the inlet bypass passageway 136 are coaxial. Illustratively, the inlet turbine passageway 134 and the inlet bypass passageway 136 each form an annular ring and extend around the central axis 19 so the inlet turbine passageway 134 and the inlet bypass passageway 136 are coaxial. In the exemplary embodiment, the core-flow director 140 is provided by a set of doors 141 that is mounted to pivot between the opened and closed positions. The set of doors 141 extend around the central axis 19 and is located between the inlet turbine passageway 134 and the inlet bypass passageway 136 when in the closed position. In the exemplary embodiment, the set of doors 141 forms an annular ring and is coaxial with the inlet turbine passageway 134 and the inlet bypass passageway 136. The set of doors 141 pivot inwardly when the core-flow director 140 is moved to the closed position.

The inlet turbine 132 includes an inlet turbine wheel assembly 146 and an inlet turbine shroud 148 to locate the inlet turbine passageway 134 therebetween as shown in FIGS. 6-7. A set of inlet turbine blades 150 extend from the inlet turbine wheel assembly 146 into the inlet turbine passageway 134 to interact with air passing through the inlet turbine passageway 134. When the core-flow director 140 is in the closed position, air is forced to pass through the inlet turbine passageway 134 and interact with the inlet turbine 132 before entering the gas turbine core 12 causing the inlet turbine 132 to rotate.

In the exemplary embodiment, the inlet assembly 114 further includes a an inlet-flow director 170 configured to allow or block air from entering the inlet turbine passageway 134 and interacting with the inlet turbine 132 as shown in FIGS. 6-7. Illustratively, the inlet-flow director 170 is provided by a set of doors 172 that is mounted to pivot between the opened and closed positions. The set of doors 172 extends around the central axis 19 and is located between the inlet turbine passageway 134 and the inlet bypass passageway 136. In the exemplary embodiment, the set of doors 172 forms an annular ring and is coaxial with the inlet turbine passageway 134 and the inlet bypass passageway 136. The set of doors 172 pivot outwardly when the core-flow director 140 is moved to the open position. Notably, the inlet-flow director 170 may be incorporated into the inlet assembly 14 shown in FIGS. 1-3.

The inlet-flow director 170 and the core-flow director 140 cooperate to control the flow of air through the inlet turbine passageway 134 and the inlet bypass passageway 136 as shown in FIGS. 6-7. When the inlet assembly 114 is in the open position the inlet-flow director 170 is closed and the core-flow director 140 is open forcing air to flow through the inlet bypass passageway 136 before entering the gas turbine core 12. Upon receiving a signal from the controller 158 to move to the closed position, the inlet-flow director 170 pivots inwardly allowing air to access to the inlet turbine passageway 134 and the core-flow director 140 pivots inwardly blocking access for air passing through the inlet bypass passageway 136 from entering the engine core. The closed position forces are entering the gas turbine core 12 to flow through the inlet turbine passageway 134 and interact with the inlet turbine 132 before entering gas turbine core 12.

The high-Mach engine 110 can further include an inlet control system 152 including a sensor 154, a core-flow-director actuator 156, an inlet-flow-director actuator 174, and a controller 158 coupled to the transmission 16, the sensor 154, the core-flow-director actuator 156, and the inlet-flow-director actuator 174 as shown in FIGS. 6 and 7. When the sensor 154 detects a certain parameter of the high-Mach engine 110 it sends a signal to the controller 158. When the controller 158 receives the data from the sensor 154 it directs the core-flow-director actuator 156 to move the core-flow director 140 and the inlet-flow-director actuator 174 to move the inlet-flow director 170 from the open position to the closed position thereby forcing air to pass through the inlet turbine passageway 134 before interacting with the gas turbine core 12. Conversely, the controller 158 may direct the core-flow-director actuator 156 to move the core-flow director 140 to the open position and the inlet-flow-director actuator 174 to move the inlet-flow director 170 to the open position, thereby allowing air to enter the gas turbine core 12 from the inlet bypass passageway 136. Moreover, in some embodiments, the controller 158 can move the core-flow director 140 and the inlet-flow director 170 to various locations between the open position and the closed position based on data from the sensor 154.

In an embodiment, the core-flow director 140 can be operated independently of the inlet-flow director 170. Illustratively, the controller 158 can direct the core-flow director 140 to move to the closed position independent of the inlet-flow director 170 or the controller 158 can direct the inlet-flow director to move to the closed position independent of the core-flow director 140. The set of doors 172 of the inlet-flow director 170 can pivot inwardly to allow air to access the inlet turbine passageway 134 and rotate the inlet turbine 132 so that air can enter the gas turbine inlet 24 from the inlet turbine passageway 134 and the inlet bypass passageway 136.

The sensor 154 in the illustrative embodiment is configured to detect the speed of the high-Mach engine 110 moving through the atmosphere 17. When the sensor 154 detects the high-Mach engine 110 moving at a predetermined speed, the sensor 154 sends a signal to the controller 158. It is within the scope of the present disclosure for the predetermined speed to be about, or specifically Mach 4 or Mach 5. In other embodiments, the predetermined speed is less than Mach 4.

The core-flow-director actuator 156 is coupled to the core-flow director 140 and the controller 158 as shown in FIGS. 6 and 7. The core-flow-director actuator 156 functions to pivot the set of doors 141 of the core-flow director 140 from the opened position to the closed position when the controller 158 sends a signal.

A method 200 of operating a high-Mach engine 10, 110 includes propelling the high-Mach engine 10, 110 to a speed greater than Mach 1, detecting 210 the speed of the high-Mach engine 10, 110, closing 220 the inlet bypass passageway 36, 136, measuring 230 the speed of rotation of the inlet turbine 32, 132, directing 240 the clutch 26 of the transmission 16 to move to the engaged position, and transferring 250 power from the inlet turbine 32, 132 to a core generator 23, or any suitable component of the high-Mach engine 10, 110, in response to the high-Mach engine 10, 110 reaching a pre-determined speed as suggested in FIG. 8.

The step of detecting 210 the speed of the high-Mach engine 10, 110 illustratively is performed by a sensor 54, 154. Upon reaching a pre-determined speed of the high-Mach engine 10, 110 moving through the surrounding atmosphere 17, the sensor 54, 154 sends a signal to the controller 58, 158.

The step of closing 220 the inlet bypass passageway by moving 220 the core-flow director 40, 140 from the open position to the closed position is performed when the controller 58, 158 receives the signal from the sensor 54, 154. The controller 58, 158 sends a signal to the core-flow-director actuator 56, 156 to move the core-flow director 40, 140 from the open position to the closed position. The step of closing 220 forces air from atmosphere 17 to interact with the inlet turbine 32, 132 and begin to rotate the inlet turbine 32, 132 due to the change of mass flow. The air passing through the inlet turbine passageway 34, 134 interacts with the inlet turbine 32, 132 before entering the compressor 18 of the gas turbine core 12 such that air is cooled before entering the compressor 12.

The step of measuring 230 the rate of rotation of the inlet turbine 32, 132 is performed by a rotation sensor 70. When the core-flow director 40, 140 moves to the closed position, air is forced to enter the inlet turbine passageway 34, 134 and rotate the inlet turbine 32, 132. The rotation sensor 70 measures the rate of rotation of the inlet turbine 32, 132 and sends data to the controller 58, 158. When the rate of rotation of the inlet turbine 32, 132 reaches a desired value, the controller sends a signal to the transmission 16.

The step of moving 240 the transmission 16 to the engaged configuration is performed by the controller 58, 158. When the rotation of the inlet turbine 32, 132 reaches a predetermined speed as determined by the rotation sensor 70, the controller 58, 158 directs the hydraulic solenoid 28 to move the clutch 26 from the disengaged position to the engaged position to interact with the corresponding splines 65 of the countershaft assembly 60. When the clutch 26 engages with the corresponding splines 65 the output shaft 42 of the inlet turbine 32, 132 drives the countershaft assembly 60.

The step of transferring 250 power to the core generator 23, or any suitable component of the high-Mach engine 10, 110, is performed when the clutch 26 has moved to the engaged position so the inlet turbine 32, 132 is coupled with the core turbine 20. Air passing through the inlet turbine passageway 34 rotates the inlet turbine 32, 132 and drives the output shaft 42 and the inlet turbine pinion 62. The inlet turbine pinion 62 drives the gear-shaft gear 63 and rotates the countershaft-gear shaft 66. The countershaft-gear shaft 66 drives the countershaft pinion 64 which drives the input shaft gear 68 which rotates the input shaft 21 of the core turbine 20. Driving the input shaft 21 of the core turbine 20 can power the core generator 23.

When the core-flow director 40, 140 is in the open position air can flow from the atmosphere 17 through the inlet bypass passageway 36, 136 to a gas turbine core 12 without interacting with the inlet turbine 32, 132 as shown in FIGS. 2 and 6. When the core-flow director 40, 140 is in the closed position, air is forced to flow through an inlet turbine passageway 34, 134 to interact with the inlet turbine 32, 132 to cool the air before reaching the gas turbine core 12 as shown in FIGS. 3 and 7.

In another embodiment, the rotation sensor 70 detects the rate of rotation of the core turbine 20. In this embodiment, the step of measuring 230 uses the rotation sensor 70 to measure the rate of rotation of the core turbine 20 and sends data to the controller 58, 158.

High-Mach engines have been designed previously such that the overall engine design can be complex. Concepts involving heat exchangers and refrigeration systems have been attempted but are typically heavy and expensive and must be able to survive long periods of storage before use. Embodiments of the present disclosure do not require sealed systems that may leak and become ineffective when called upon for use after many possible years of storage.

In some embodiments, a gas turbine engine with an inlet (e.g., the high-Mach engine 10, 110) traveling at Mach 4 or greater requires cooling such that materials in the compressor 18 are cool enough to maintain structural properties. A potential solution for cooling may be to place a turbine in the inlet (e.g., inlet turbine 32, 132) to the high-Mach engine 10, 110 to take energy out of the high temperature air thus cooling it prior to entry into the compressor 18. Additionally, the work extracted from the inlet turbine 32, 132 can be converted to electricity through the use of a core generator 23 for use elsewhere in the high-Mach engine 10, 110 or airframe. The inlet turbine 32, 132 can also be connected to an alternate compressor to provide high pressure air for use elsewhere in the engine or airframe.

This invention consists of a gas turbine engine architecture that contains a gas turbine core 12 with a compressor 18, combustor 22, and a core turbine 20 along with an additional turbine (e.g. the inlet turbine 32, 132) that is placed in the inlet (e.g., in the inlet assembly 14, 114) upstream from the gas turbine core 12. The purpose for placing the additional turbine (e.g. the inlet turbine 32, 132) in the engine inlet is to remove energy in the form of heat from the high temperature air entering the engine inlet at high Mach speeds. The inlet turbine 32, 132 can be connected to a device such as but not limited to a core generator 23, or the core turbine 20 by a shaft such that the heat energy removed can be converted to another form of energy that can be used elsewhere in the engine or airframe.

In one embodiment, the inlet door (e.g., the inlet-flow director 170) opens to allow some of the air in the inlet to enter the inlet turbine 32, 132. The bypass door (e.g., the core-flow director 40, 140) also opens to allow the remaining air to reach the gas turbine core 12. Air entering the inlet turbine 32, 132 expands while turning the inlet turbine 32, 132. Analysis indicates that the work removed through this expansion and turning of the inlet turbine 32, 132 is enough to reduce the air temperature exiting the inlet turbine 32, 132 to a level that will not cause stress to the compressor components. The inlet turbine 32, 132 causes the downstream gas turbine core 12 to think it is flying at a slower speed than the vehicle (e.g., the high-Mach engine 10, 110) actually is.

The transmission 16 can move from the disengaged configuration to the engaged configuration. Initially the engagement sleeve (e.g. clutch 26) is disengaged. In this configuration, no power can be transferred between the inlet turbine 32, 132 and the gas turbine core 12. As speed of the high-Mach engine reaches a predetermined speed using the gas turbine core 12, the set of doors 141, 172 pivot inwardly and the inlet turbine 32, 132 speed increases due to mass flow. The inlet turbine pinion 62 will drive the gear-shaft gear 63 on the countershaft, increasing the speed of the countershaft-gear shaft 66. The gear set 30 is maintaining the countershaft pinion 64 at a ratio relative to the core turbine 20 speed.

As the speed of the inlet turbine 32, 132 increases it will synchronize the countershaft pinion 64 to the gear-shaft gear 63. The clutch 26 is then directed to engage, connecting power from the inlet turbine 32, 132 to the gas turbine core 12, by an input shaft 21 coupled to the core generator 23. The pressure for hydraulic solenoid 28 can be from a hydraulic system or fuel to actuate the clutch 26 in a method known to those in the power transmission industry. The inlet assembly 14 and the transmission 16 cooperate to provide a proper speed match between the inlet turbine 32, 132 and the core turbine 20 at a high speed to provide the maximum recovery of thrust work back to the compressor 18 and the core generator 23. As the speed further increases, the core generator 23 power can be used to heat a duct grid to reduce inlet temperature. In an embodiment, if the compressor 18 is bypassed, the inlet turbine 32 will continue to drive the core generator 23 to supply systems with the necessary electrical power for operation.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A high-Mach engine comprising
a gas turbine engine core including a compressor, a combustor, and a core turbine,
an inlet assembly at an inlet of the high-mach engine including an inlet turbine configured to be driven by at least a first portion of air entering the high-Mach engine from atmosphere before the at least the first portion of air reaches the compressor of the gas turbine engine core when the high-Mach engine is travelling at high speeds to cool the at least the first portion of air that enters the gas turbine core,
a transmission configured to selectively couple the inlet turbine to the core turbine and the compressor of the gas turbine engine core such that the transmission is movable between (i) a disengaged configuration in which the inlet turbine is rotatable independent of the core turbine and the compressor, and (ii) an engaged configuration in which the inlet turbine drives rotation of the core turbine and the compressor, and
a controller coupled to the transmission, the controller configured to move the transmission from the disengaged configuration to the engaged configuration at the high speeds and from the engaged configuration to the disengaged configuration at low speeds based on at least one of a speed input associated with rotation of the inlet turbine and a speed input associated with the rotation of the core turbine,
wherein the inlet assembly defines an inlet bypass passageway configured to selectively conduct a second portion of air entering the high-Mach engine from the atmosphere to the compressor of the gas turbine engine core without interacting directly with the inlet turbine and the inlet assembly includes a core-flow director translatable along a central engine axis between (i) an open position arranged to allow the second portion of air to move through the inlet bypass passageway and interact with the gas turbine engine core without interacting directly with the inlet turbine and (ii) a closed position arranged to block the second portion of air from moving through the inlet bypass passageway into the gas turbine engine core so that the second portion of air entering the gas turbine engine core interacts directly with the inlet turbine, and
wherein the inlet assembly comprises an opening that is arranged to allow the at least the first portion of air to interact with the inlet turbine when the core flow director is in either of the open and closed positions.

2. The high-Mach engine of claim 1, wherein the controller is coupled to the core-flow director and is configured to move the core-flow director from the closed position to the opened position based on at least one of the speed input associated with the core turbine, the speed input associated with the inlet turbine, and speed of the high-Mach engine through the atmosphere.

3. The high-Mach engine of claim 1, further comprising a generator coupled to the gas turbine engine core to be driven by the gas turbine core.

4. The high-Mach engine of claim 1, wherein the transmission includes a clutch configured to move from a disengaged position associated with the disengaged configuration of the transmission to an engaged position associated with the engaged configuration of the transmission.

5. The high-Mach engine of claim 4, wherein the clutch is a sleeve having first splines, the sleeve configured to slide along a clutch axis from the disengaged position in which the first splines are disengaged from corresponding second splines to the engaged position in which the first splines are engaged with the corresponding second splines.

6. The high-Mach engine of claim 5, wherein the transmission includes a hydraulic solenoid coupled to the sleeve and to a pressurized fuel source, the hydraulic solenoid configured to drive the sleeve from the disengaged position to the engaged position with fuel pressure.

7. The high-Mach engine of claim 4, wherein the transmission includes a gear set coupled between an output shaft mounted to the inlet turbine and an input shaft mounted to the core turbine.

8. The high-Mach engine of claim 7, wherein the gear set is configured such that a speed of the inlet turbine is lower than a corresponding speed of the core turbine.

9. A high-Mach engine comprising
a gas turbine engine core including a compressor, a combustor, and a core turbine,
an inlet turbine configured to be driven by at least a first portion of air entering the high-Mach engine from atmosphere before the at least the first portion of air reaches the compressor of the gas turbine engine core, and
a transmission configured to couple the inlet turbine to the gas turbine engine core at high speeds such that rotation of the inlet turbine is transmitted to the core turbine and the compressor of the gas turbine engine core and to decouple the inlet turbine from the core turbine and the compressor of the gas turbine engine core at low speeds,
wherein an inlet assembly at an inlet of the high-mach engine that includes the inlet turbine defines an inlet bypass passageway configured to conduct a second portion of air entering the high-Mach engine from the atmosphere to the compressor of the gas turbine engine core without interacting directly with the inlet turbine,
wherein the inlet assembly includes a core-flow director translatable along a central engine axis and configured in a closed position to block the second portion of air from flowing through the inlet bypass passageway and in an open position to allow the second portion of air to flow through the inlet bypass passageway to the compressor of the gas turbine engine core, and
wherein the inlet assembly comprises an opening that is arranged to allow the at least the first portion of air to interact with the inlet turbine when the core flow director is in either of the open and closed positions.

10. The high-Mach engine of claim 9, wherein the transmission is reconfigurable from a disengaged configuration in which the inlet turbine is rotatable independent of the core turbine to an engaged configuration in which the inlet turbine drives rotation of the core turbine.

11. The high-Mach engine of claim 10, wherein the transmission includes a splined sleeve mounted to slide along an axis from a disengaged position associated with the disengaged configuration of the transmission to an engaged position associated with the engaged configuration of the transmission.

12. The high-Mach engine of claim 11, further comprising a controller coupled to the transmission, the controller configured to move the splined sleeve from the disengaged position to the engaged position based at least one of a speed input associated with the rotation of the inlet turbine and a speed input associated with the rotation of the core turbine.

* * * * *